United States Patent
Festa et al.

(10) Patent No.: US 11,061,717 B2
(45) Date of Patent: Jul. 13, 2021

(54) AUTOMATION AS A SERVICE

(71) Applicant: JPMorgan Chase Bank, N.A., New York, NY (US)

(72) Inventors: Chris Festa, Jersey City, NJ (US); Jody Spearing, Jersey City, NJ (US); Justin A. Applewhite, Maplewood, NJ (US); Mani Periakaruppan, Dublin, OH (US); Warren Humphreys, Southampton (GB)

(73) Assignee: JPMorgan Chase Bank, N.A., New York, NY (US)

( * ) Notice: Subject to any disclaimer, the term of this patent is extended or adjusted under 35 U.S.C. 154(b) by 57 days.

(21) Appl. No.: 16/249,293

(22) Filed: Jan. 16, 2019

(65) Prior Publication Data
US 2019/0220305 A1   Jul. 18, 2019

Related U.S. Application Data

(60) Provisional application No. 62/617,849, filed on Jan. 16, 2018.

(51) Int. Cl.
| | |
|---|---|
| *G06F 9/46* | (2006.01) |
| *G06F 9/48* | (2006.01) |
| *G06F 9/50* | (2006.01) |
| *G06F 8/70* | (2018.01) |
| *G06F 21/31* | (2013.01) |
| *G06F 21/57* | (2013.01) |

(52) U.S. Cl.
CPC .............. *G06F 9/4843* (2013.01); *G06F 8/70* (2013.01); *G06F 9/5005* (2013.01); *G06F 21/31* (2013.01); *G06F 21/57* (2013.01)

(58) Field of Classification Search
CPC ..................................................... G06F 9/4843
USPC .......................................................... 718/100
See application file for complete search history.

(56) References Cited

U.S. PATENT DOCUMENTS

| | | | | |
|---|---|---|---|---|
| 7,139,999 | B2 * | 11/2006 | Bowman-Amuah | ....................... G06Q 10/06 717/101 |
| 8,543,438 | B1 * | 9/2013 | Fleiss | .................. G06Q 10/0631 705/7.13 |
| 9,077,823 | B1 * | 7/2015 | Grosz | ................. H04N 1/00196 |
| 9,250,893 | B2 * | 2/2016 | Blahaerath | ................ G06F 8/71 |
| 10,248,653 | B2 * | 4/2019 | Blassin | .......... G06Q 10/063112 |
| 2010/0162201 | A1 * | 6/2010 | Shnaiderman | ............ G06F 8/61 717/101 |
| 2012/0089971 | A1 * | 4/2012 | Williams | ................... G06F 8/61 717/167 |
| 2015/0304399 | A1 * | 10/2015 | Kramer | ............... H04L 41/0886 713/162 |

* cited by examiner

*Primary Examiner* — Evral E Bodden
(74) *Attorney, Agent, or Firm* — Greenblum & Bernstein, P.L.C.

(57) ABSTRACT

A method of creating microservices based on the needs of computer system users throughout an organization and storing those microservices in a repository that allows for version control and execution monitoring is provided. The method includes the identification of a needed microservice, the assignment to a resource for the development of the microservice, testing of the microservice, and presenting the microservice to users for execution. The method further includes tracking the execution of the microservices and output produced during that execution.

20 Claims, 6 Drawing Sheets

AUTOMATION AS A SERVICE

TECHNICAL FIELD

This disclosure relates generally to systems and methods for centralizing the automation of certain repeating computer tasks.

BACKGROUND

Large businesses and other organizations may have thousands of computer users, each of which may be required to frequently perform certain tasks using computer systems relied upon by the business or organization to function. These tasks may be burdensome to perform individually and repeatedly, and therefore a user may generate computer scripts or function routines to leverage computer resources to perform a task automatically. A large number of users generally results in an even larger number of computer scripts and function routines in use throughout an organization. Each of these scripts or function routines can introduce risk to the computer systems of the organization such as data corruption, security concerns, and/or inefficient use of system resources. Additionally, the prevalence of various scripts may become duplicative within an organization as each user writes scripts or function routines to accomplish various individual tasks.

Furthermore, many of the tasks performed by these scripts or routines are regularly repeated and/or duplicated by the same user or other users. Standardizing and consolidating these tasks would result in a more stable and efficient computer system for an organization. Therefore, it is appreciated that a need exists for systems and methods for consolidating computer scripts or function routines used throughout an organization to improve performance of the organization's computer resources. Consolidated scripts and function routines may then be standardized and made available throughout the organization via a centralized repository.

SUMMARY

This disclosure relates generally to systems and methods for centralizing the automation of certain repeating computer tasks.

In an exemplary embodiment, a method of automating repeatable computer tasks is provided. The method comprising: receiving a request for automation of at least one repeatable computer task, generating a microservice comprised of the at least one repeatable computer task, and deploying the microservice for execution.

In another exemplary embodiment, a system for accessing a microservice is provided. The system comprising: a user interface configured to receive an microservice access request from a user, a security gateway configured to validate the identity of the user, and an automation module configured to communicate with a microservice associated with the microservice access request and execute the microservice according to the microservice access request.

In yet another exemplary embodiment, a method of accessing a microservice is provided. The method comprising: receiving, from a user interface, a microservice access request from a user, receiving, from a security gateway, validation of the identity of the user, communicating with a microservice associated with the microservice access request, executing the microservice according to the microservice access request.

These and other objects, features, and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Aspects and implementations of the present disclosure will be understood more fully from the detailed description given below and from the accompanying drawings. This should not be taken to limit the disclosure to the specific aspects or implementations and is offered for explanation and understanding only.

Exemplary embodiments of the present disclosure are directed to systems and methods for empowering an organization to leverage its users to execute "self-service" automation of repeatable computerized tasks through interaction with a centralized automation service, which may be referred to herein as Automation as a Service (AaaS). AaaS and its components further enhance an organization's ability to automate certain repeated computerized tasks through an open source model which allows any user to create and/or request the creation of an automated task without going through a traditional software development process. AaaS may be initialized when an organization or member thereof identifies a need for a repeating computerized task. The need drives the creation of a project to develop one or more computer scripts or function routines configured to perform the computerized task. One or more scripts and/or function routines may be used to create a microservice. A contributor is assigned to develop a microservice to perform the task as requested by the user. In an exemplary embodiment, the contributor performs the necessary development activities to create the microservice and submits a request that the created microservice be made available to a development service within the organization.

In certain embodiments, engineering and quality organizations responsible for managing the provisioning of automated services may review and test a submitted microservice to ensure that the microservice conforms to organization guidelines and does not compromise security or computer resources. In some exemplary embodiments, a submitted microservice may be subject to a peer review process. When reviews and/or testing have been completed, a microservice may be released for use throughout the organization or made available specifically to the users with the need to perform the function provided by the microservice. Certain exemplary embodiments provide monitoring of microservice runtime and other parameters to allow the organization to identify potential errors, misuse, or expected performance characteristics.

Figure 1:
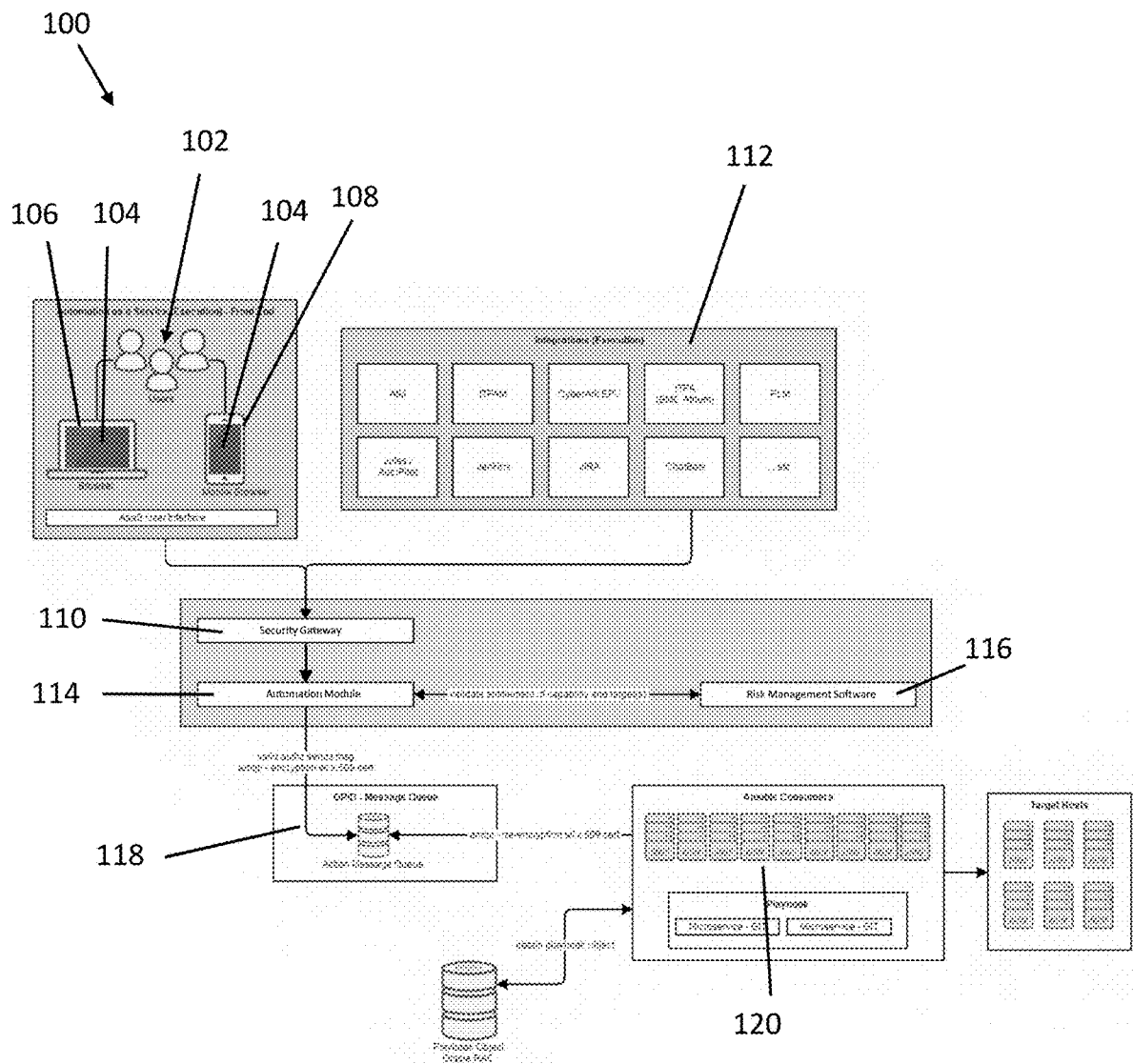
FIG. 1 is a diagram illustrating an exemplary system architecture of the present disclosure.

In an exemplary AaaS system architecture 100 illustrated in FIG. 1, a user 102 can access AaaS through a user interface 104. In some exemplary embodiments, user interface 104 is accessible from a PC-based web browser 106 or a mobile web browser 108. Browser-based access may include access through a secure website, electronic portal, or the like. It will be appreciated that a browser (e.g. web browser 106 and 108) may be executed by a user device comprising various configurations of computer hardware and software as known to those of skill in the art, e.g. a desktop or laptop computer, tablet, mobile phone, or the like, comprising at least one processor in communication with a memory, such that the processor is configured to execute instructions stored in the memory. It will be further appreciated that a user device may be further configured to accept and process user input to interact with user interface 104. A user device may further comprise or be operably connected to one or more displays for displaying the user interface 104.

The user interface 104 may communicate with a security gateway 110 over a network (e.g. Internet or intranet network) in order to validate a user's entitlements to access the AaaS. The security gateway 110 may further be configured to identify a user and provide associated user permission characteristics to microservices which the user wishes to access. In some embodiments, security gateway 110 is configured to communicate with entitlement systems to access user credentials or similar information to validate a user identity or confirm that a user 102 is authorized to access the AaaS. Security gateway 110 may be configured to communicate with various applications 112 in order to obtain additional information about a user or system in order to perform verification. Once properly validated, both the user 102 and applications 112 (e.g. Jules/AutoPilot, Jenkins, JIRA, ChatBots, CyberArk Enterprise Password Vault, etc.) may then be provided access to an automation module 114. Automation module 114 may comprise an AaaS application program interface (API). In some embodiments, automation module 114 can validate the entitlements of the user 102 and a microservice with regard to the intended target assets affected by execution of the microservice using risk management module 116. Risk management module 116 may comprise access control components configured to verify that a user or group of users is authorized to access the automation module 114. In certain embodiments, risk management module 116 may confirm the identity of a user using a uniquely generated user token. The validation performed by the risk management module 116 may determine if a user token is valid, ensure that metadata associated with a microservice is correct, and determine if the authenticated principal user is authorized to perform a given action against a set of assets using the microservice. In some embodiments, one or more validation procedures conducted by the risk management module 116 is performed using a policy engine. In some embodiments, the automation module 114 is configured to communicate via an encrypted service request message to a message queue 118 which then decrypts the messages and provides them to the various microservices stored in the infrastructure 120 which hosts the AaaS system.

As described herein, AaaS is intended to provide a controlled source of microservices that a user 102 or similar users would likely create themselves prior to implementation of an exemplary embodiment of the present disclosure. Business groups, users 102, and other organizational units may submit potential microservices for approval and release for use by others via the AaaS. This results in a self-service capability with the added benefit of levels of standardization and control that are provided by the AaaS. In exemplary embodiments, microservices maintained by the AaaS are subject to version control with the ability to roll back changes to enable earlier versions of the microservice to be recovered. In addition, the centralized nature of the AaaS provides the ability to audit microservice execution. In an exemplary embodiment, the execution of microservices is logged for a predetermined amount of time, e.g. 13 months. These logs provide a record of how, who, where, and what was executed for each microservice. The predetermine time for logging may be based on an organizational audit requirement or user or organizational preference. The standard output of each execution is also logged with the exception of log pulls which are purged every 24 hours. When logged, the standard output is encrypted using application level encryption (ALE).

Figure 2:
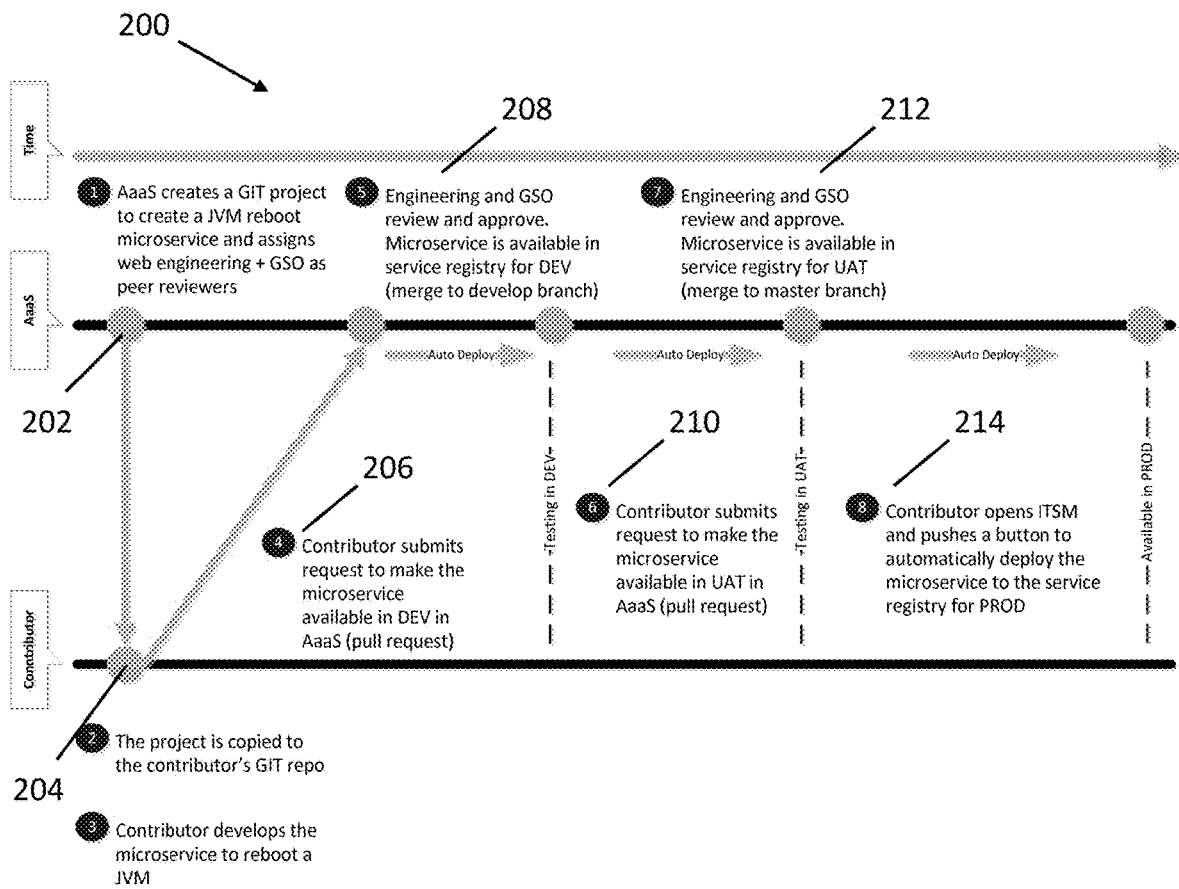
FIG. 2 is a diagram of a process of creating and releasing a microservice into a production environment, according to an exemplary embodiment.

As is shown in the process 200 of FIG. 2, administrators of AaaS may create a project to develop a microservice at 202. Each microservice project may include one or more project parameters that describe the project and the desired microservice. In some embodiments, a project may be created in response to a user request. In other embodiments, a project may be created automatically according to a recognized need. For example, if it is recognized that a certain task is being repeated many times on a system by a certain user or groups of users, AaaS may be configured to recognize that a need exists for a microservice to perform the task and automatically generate a project or project request. In certain other embodiments, a project is created in response to a user submission of computer scripts or function routines frequently performed by the user that could be turned into a microservice.

Once a project has been created, a contributor can be identified, and the project may be copied to the identified contributor's task list at 204. The contributor is tasked with creating the microservice. The contributor may be one or more software developers sufficient to create the microservice based on the project. The contributor may also generate or provide metadata associated with each microservice created. The metadata may contain the name of the microservice, a description of the microservice, compatible platforms (e.g. Windows, Linux, Solaris, etc.), key-value pairs that can be used to customize the microservice, an example of the microservice functionality, the underlining script/code that can be performed on a target node or asset, the capability that the entitlements are based on, etc. The contributor can also provide data with regard to the domain, scope, and capabilities of the microservice. As used herein, a capability is a set of tasks or actions that can be performed on an asset, e.g. computer system, one or more servers, etc. Microservices are associated with a capability. Once the contributor completes the development of the microservice according to the project, the microservice is made available for approval in a development region of an organization's computer network at 206. At 208, the microservice is reviewed and approved by engineering and quality functions. Review of the microservice may also involve a peer review process in some exemplary embodiments. If approved, the contributor requests that the microservice be subject to user acceptance testing (UAT) at 210. If the microservice is approved at 212, the contributor is given the option of releasing it into a production environment at 214. Once in production, users may access the AaaS user interface to execute the microservice as was illustrated in FIG. 1.

Figure 3:
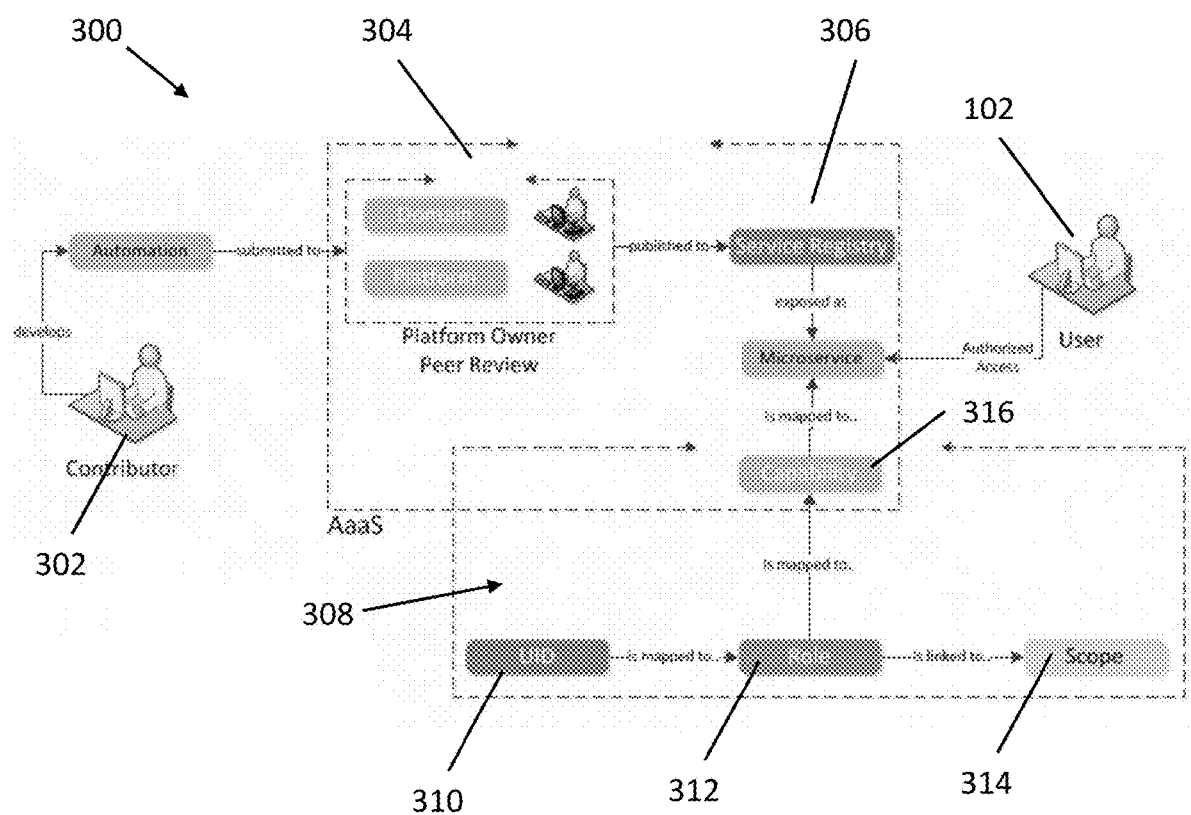
FIG. 3 is a diagram of a system implementing a process of creating a microservice and mapping the microservice capabilities to enable the authorization of users to access the microservice, according to an exemplary embodiment.

A system 300 implementing the process 200 is illustrated in FIG. 3. As illustrated, in an exemplary embodiment, a contributor 302 develops a microservice and submits it for review to a peer review body 304. The reviewing body 304 in the illustrated embodiment represents reviewers responsible for domain and platform content. In such embodiments, the peer review body 304 is responsible for reviewing and approving the microservice before it is released for general use. In an exemplary embodiment, the peer review body 304 ensures that the microservice is fit for its purpose within the intended domain and scope of use. The peer review body 304 is also responsible for reviewing and certifying that the software code which forms the microservice is appropriate for use on the intended computer system. The peer review body validates that the contributor's recommendations on the capabilities of the microservice are accurate. For example, if a microservice performs a stop/start or changes the state of a component, the peer reviewer ensures the microservice performs the said action and the script/code is performing the capability correctly. Once the review processes have been completed, the approved microservice is published to a service registry 306.

Because a microservice could have functions applicable to a plurality of assets and not every user is authorized for all assets, exemplary embodiments may assert controls to limit the assets accessible by a microservice for particular users. Thus, in order to regulate which users can access a microservice and also what assets or resources can be accessed by the microservice for a particular user, an access control function 308 may be applied. As illustrated, in exemplary embodiments of the access control function 308, user ID's 310 are mapped to roles 312. Multiple scopes 314 are created to identify assets that can be linked to roles 312. As shown, these roles 312 and scopes 314 are mapped to capabilities 316. User roles 312 can be mapped vertically by assignment to a particular software application or resource. Alternatively, a user's role 312 may be mapped horizontally according to a work group to which the user is assigned. In horizontal mapping, a user may be mapped to multiple applications according to the function of the work group to which the user is assigned. In another aspect of horizontal mapping, the user may thus be mapped to more applications, but that user's needs with regard to the various applications may be more limited or restricted to certain data sources. This information is then provided to the AaaS to determine whether a user has the necessary entitlements to access a microservice or to determine what assets may be accessed by the microservice requested by the user 102. In addition to entitlement management, exemplary embodiments of AaaS may also monitor a microservice. Monitoring of a microservice may be performed in order to determine if its usage or execution is abnormal. For example, if a microservice normally averages a run time of 5 minutes, continuously running for 15 minutes will generate an alert. The alert may be sent to the user of the microservice or the party responsible for the microservice, e.g. a system administrator or the like. It will be appreciated that abnormal usage may vary by microservice and in some embodiments, may be defined as an optimal behavior of a microservice within an acceptable margin (e.g. optimal behavior is a run time of 5 minutes +/− 2 minutes).

Figure 4:
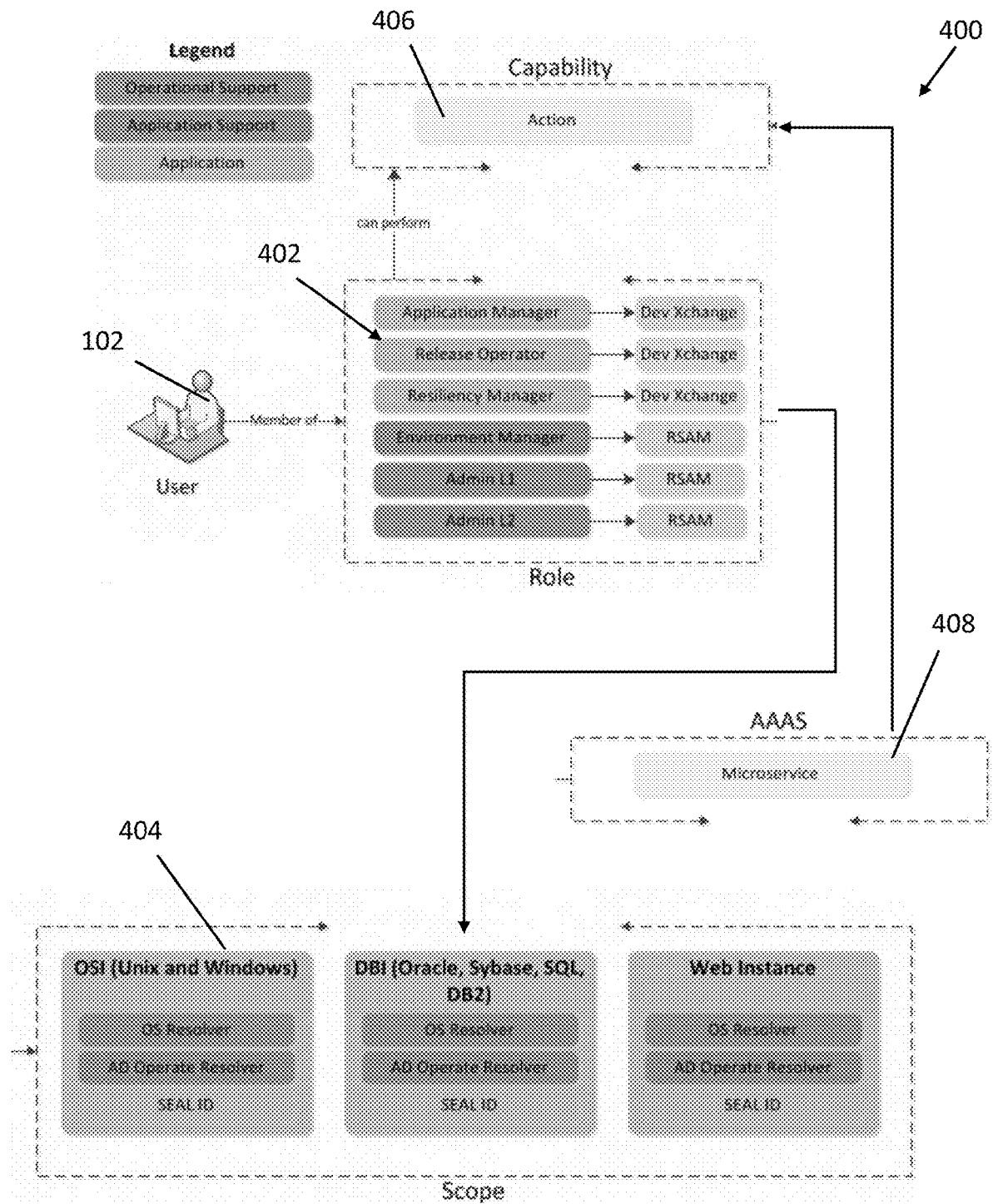
FIG. 4 is a diagram of a system implementing a process of determining the role of a user and the assignment of action capabilities to the user based on their role, according to an exemplary embodiment.

FIG. 4 illustrates a system 400 configured to implement the access control function 308 of FIG. 3. As is illustrated, a user 102 is identified and associated with a role 402. As illustrated in FIG. 4, user 102 may, for example, have one or more roles, e.g. Application Manager, Release Operator, Resiliency Manager, Environmental manager, Admin L1, Admin L2, etc. At 404, the roles can be assigned to job functions. These job functions 404 are used to determine what access the user 102 requires in order to perform their role and associated job functions. The scope of a set of job functions may be used to identify one or more assets that can be linked to a role 402. In the system 400, these roles and requirements are used to determine the actions 406 that the user 102 is authorized to perform. As illustrated, a microservice 408 is assigned to an action 406. As a result, a user 102 that is authorized to perform actions 406 are also authorized to access the microservice 408 assigned to the authorized actions 406 of the users 102. Once access is verified, user 102 may properly use the microservice 408 to perform actions 406.

Figure 5:
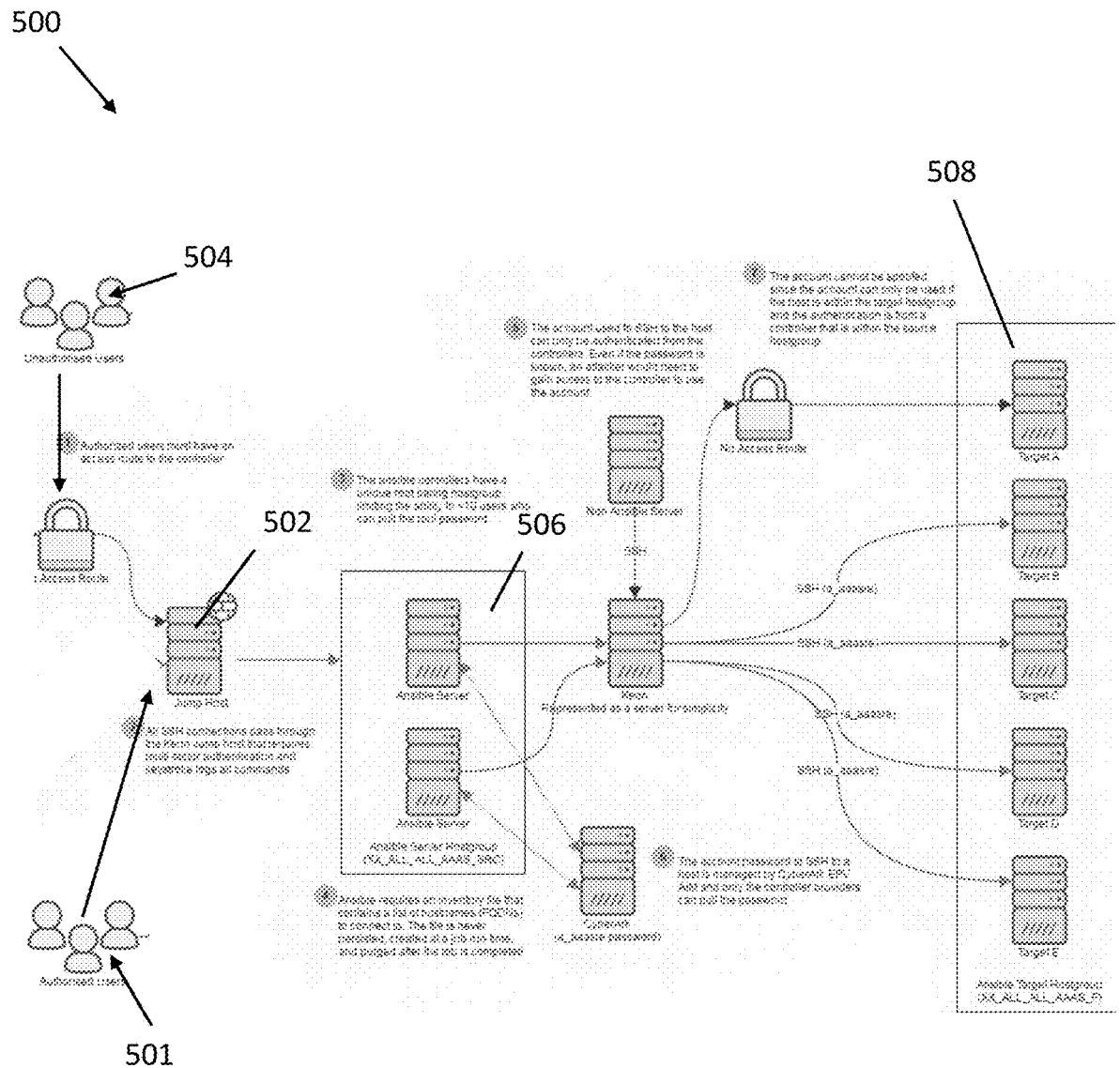
FIG. 5 is a diagram of a system for performing the processes of FIGS. 2-4 in a Unix® environment, according to an exemplary embodiment.

A system 500 for secure execution of microservices 408 by AaaS in a Unix® environment, according to an exemplary embodiment, is shown in FIG. 5. In the system 500, authorized users 501 may access AaaS through a jump host 502 (e.g. KEON Jump host). The jump host 502 limits access by unauthorized users 504 through the use of passwords, hardware key code generators, and other methods of limiting access that will be appreciated by those of skill in the art. Authorized users 501 are allowed to access the jump host 502 using techniques such as, but not limited to, federation and multi-factor authentication. Once a user is authorized, the jump host 502 may log keystrokes to capture all commands executed by authorized users 501 in order to provide monitoring and reporting functions to the organization.

In an exemplary embodiment, a controller 506 (e.g. an Ansible Controller) limits the number of users who can access a root password e.g. less than 10 users. Other exemplary embodiments may set this limit to any set number. This access limitation by the controller is designed to prevent unattended use of the system and to restrict the use to only users with proper access. The controller 506 may also require an inventory file that contains the list of hostnames that are connected to the users. This list doesn't persist and created at job run time. Once the job is complete, the list is purged. Thus, the list performs a checkout function with regard to the job that is limited to a process job that is being run by the user 102.

In some embodiments, a user account used to connect via SSH to the jump host 502 can only be authenticated from the controller 506. Thus, as is illustrated at 508, even if the password is known, an unauthorized user 504 would need to gain access to the controller 506 in order to use the account. In an exemplary embodiment, the account password used to connect using SSL to the host is managed by a CyberArk Enterprise Password Vault (EPV) server. In such an embodiment, only controller providers can access the passwords used to connect to the jump host 502.

In some embodiments, user accounts cannot be spoofed because the account can only be used if the host is within the target host group 508 and the authentication is from a controller that is within the source host group. In some exemplary embodiments, this is accomplished by the creation of a token which can only be decrypted on the target host as long as the token originated or was created by the source host.

Figure 6:
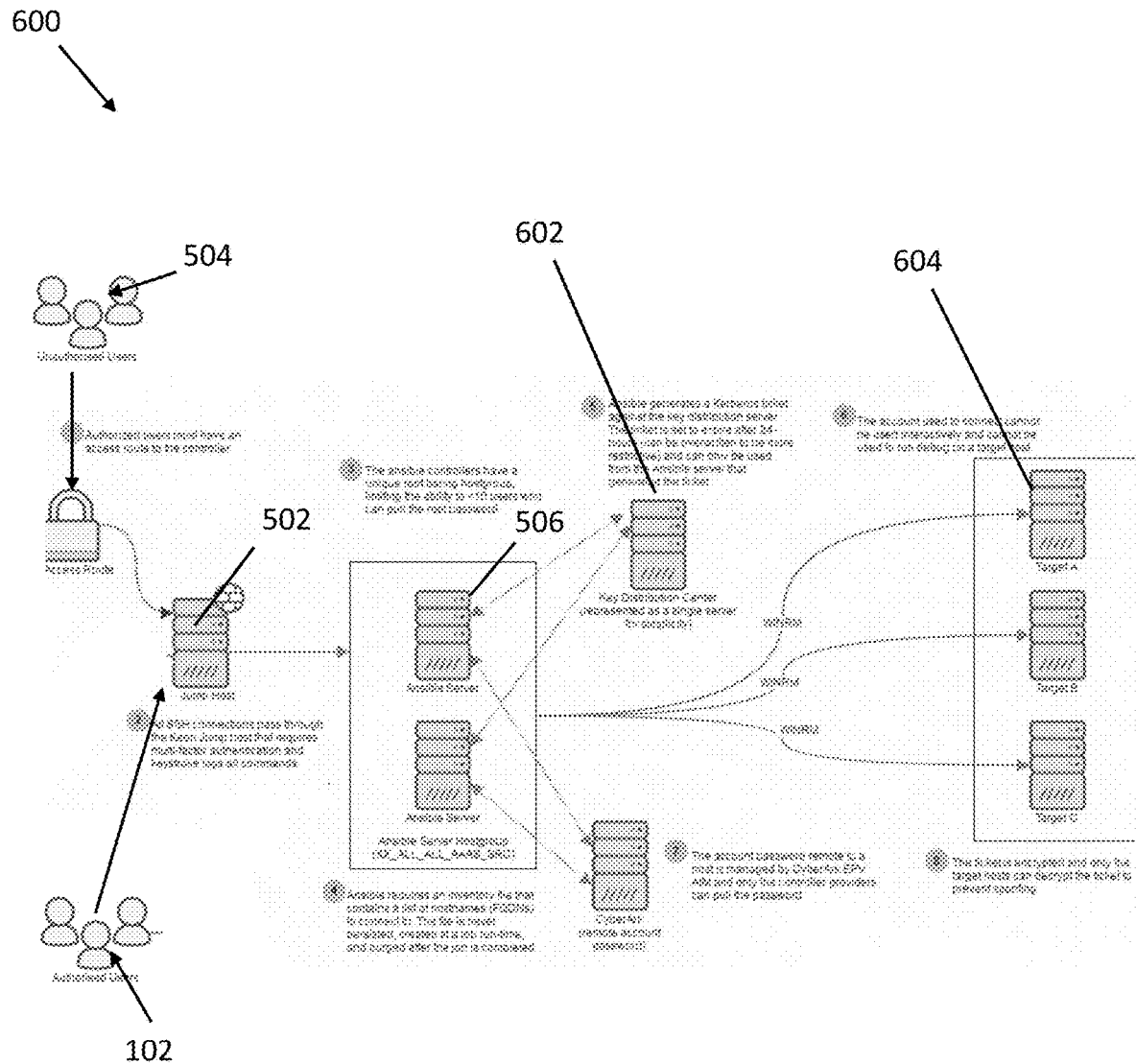
FIG. 6 is a diagram of a system for performing the processes of FIGS. 2-4 in a Windows® environment, according to an exemplary embodiment.

A system 600 for secure execution of microservices 408 by AaaS in a Microsoft Windows® environment, according to an exemplary embodiment, is shown in FIG. 6. In the illustrated embodiment, authorized users 501 access AaaS through a jump host 502. The jump host 502 limits unauthorized users 504 through the use of passwords, hardware key code generators, and other methods of limiting access. Authorized users 102 are allowed to access the jump host 502 using techniques such as, but not limited to, federation and multi-factor authentication. Once a user is authorized, the jump host 502 may logs keystrokes to capture all commands executed by the users.

In an exemplary embodiment, a controller 506 (e.g. an Ansible Controller) limits the number of users who can access a root password e.g. less than 10 users. Other exemplary embodiments may set this limit to any set number. This access limitation by the controller is designed to prevent unattended use of the system and to restrict the use to only users with proper access. The controller 506 may also require an inventory file that contains the list of hostnames that are connected to the users. This list doesn't persist and created at job run time. Once the job is complete, the list is purged. Thus, the list performs a checkout function with regard to the job that is limited to a process job that is being run by the user 102.

When operating in a Windows® environment, the controller 506 of system 600 can generate a Kerberos ticket 602 which enables secure communication between the controller 506 and target hosts 604. The Kerberos ticket may be encrypted in such a manner that only the target hosts 604 can decrypt the ticket. This prevents spoofing by unauthorized users 504. In some embodiments, the Kerberos ticket expires after 24 hours (in some exemplary embodiments this expiration may be overwritten to be a shorter period of time). In such exemplary embodiments, the controller 506 account used to connect cannot be used interactively and cannot be used to run a debug routine on the target host. As illustrated and described herein, exemplary embodiments provide a controlled source of microservices that can be subject to version control, monitoring, and reporting functions which may enhance the security and efficiency of organization.

The term "module" or "engine" used herein will be appreciated as comprising various configurations of computer hardware and/or software implemented to perform operations. In some embodiments, modules or engines as described may be represented as instructions operable to be executed by a processor and a memory. In other embodiments, modules or engines as described may be represented as instructions read or executed from a computer readable media. A module or engine may be generated according to application specific parameters or user settings. It will be appreciated by those of skill in the art that such configurations of hardware and software may vary, but remain operable in substantially similar ways.

While the present disclosure has been illustrated by the description of various embodiments thereof, and while these embodiments have been described in considerable detail, it is not the intention of the Applicant to restrict or in any way limit the scope of the disclosure to such detail. Additional advantages and modifications will readily appear to those skilled in the art. Moreover, in some instances, elements described with one embodiment may be readily adapted for use with other embodiments. Therefore, the disclosure, in its broader aspects, is not limited to the specific details, the representative apparatus, and illustrative examples shown and described. Accordingly, departures may be made from such details without departing from the spirit or scope of the general disclosed concepts.

The invention claimed is:

1. A method of automating repeatable computer tasks, the method comprising:
   receiving a request for automation of at least one repeatable computer task;
   generating a microservice comprised of the at least one repeatable computer task and an access control function that includes a mapping of user identification to user roles, the mapping including at least one from among a vertical mapping of the user roles to a software application and a horizontal mapping of the user roles to a work group that a user is assigned;
   integrating the access control function with the microservice;
   reviewing the microservice by using at least one from among a peer review process and a user acceptance testing process; and
   deploying the microservice for execution by releasing the microservice from a development environment to a production environment.

2. The method of claim 1, wherein the request for automation is manually generated by a user.

3. The method of claim 1, wherein the request for automation is automatically generated based on a recognized need.

4. The method of claim 1, further comprising:
   monitoring execution of the deployed microservice to determine abnormal usage.

5. The method of claim 4, further comprising:
   storing results of the monitoring in a log.

6. The method of claim 5, further comprising:
   determining abnormal usage associated with the deployed microservice;
   accessing a prior version of the microservice at a version control system; and
   rolling back the microservice to a prior version.

7. The method of claim 1, further comprising:
   receiving a plurality of project parameters associated with the at least one repeatable computer task;
   generating a microservice project based on the plurality of project parameters; and
   assigning the microservice project to a contributor.

8. The method of claim 1, wherein the microservice is deployed in response to an access request submitted by a user.

9. The method of claim 1, further comprising:
   providing the microservice to a peer review body for review.

10. A system configured to access a microservice, the system comprising:
    a first processor that implements a user interface configured to:
      receive a microservice access request from a user, the microservice access request including a request for automation of at least one repeatable computer task;
      generate a microservice comprised of the at least one repeatable computer task and an access control function that includes a mapping of user identification to user roles, the mapping including at least one from among a vertical mapping of the user roles to a software application and a horizontal mapping of the user roles to a work group that a user is assigned;

integrate the access control function with the microservice; and deploy the microservice for execution by releasing the microservice from a development environment to a production environment;

a second processor that implements, a security gateway configured to validate the identity of the user and transmit corresponding user permission characteristics based on the microservice access request, the user permission characteristics including entitlement information relating to the user obtained from a network application; and an automation module configured to communicate with the deployed microservice that is associated with the microservice access request and execute the deployed microservice according to the microservice access request, wherein the first processor is communicatively coupled to the second processor via a network.

11. The system of claim 10, wherein the user interface is accessible via a web browser.

12. The system of claim 10, wherein the automation module is further configured to monitor the execution of the executed microservice to determined abnormal usage.

13. The system of claim 12, wherein the automation module is further configured to store the results of the monitoring of the execution of the executed microservice in a log.

14. The system of claim 13, wherein the automation module is further configured to:

determine abnormal usage associated with the execution of the microservice;

access a prior version of the microservice at a version control system; and roll back the microservice to a prior version.

15. The system of claim 10, wherein the user interface is accessible via a jump host connection.

16. A method of accessing a microservice, the method comprising:

receiving, from a user interface, a microservice access request from a user, the microservice access request including a request for automation of at least one repeatable computer task;

generating a microservice comprised of the at least one repeatable computer task and an access control function that includes a mapping of user identification to user roles, the mapping including at least one from among a vertical mapping of the user roles to a software application and a horizontal mapping of the user roles to a work group that a user is assigned;

integrating the access control function with the microservice;

deploying the microservice for execution by releasing the microservice from a development environment to a production environment;

receiving, from a security gateway, validation of the identity of the user;

receiving, from the security gateway, user permission characteristics corresponding to the user based on the microservice access request, the user permission characteristics including entitlement information relating to the user obtained from a network application;

communicating with the deployed microservice associated with the microservice access request; and executing the deployed microservice according to the microservice access request.

17. The method of claim 16, further comprising:
monitoring the execution of the microservice to determine abnormal usage.

18. The method of claim 17, further comprising:
storing the results of the monitoring in a log.

19. The method of claim 17, further comprising:
determining abnormal usage associated with the execution of the microservice;
accessing a prior version of the microservice at a version control system; and
rolling back the microservice to a prior version.

20. The method of claim 16, wherein the user interface is accessible via a jump host connection.

* * * * *